Oct. 11, 1938.   W. DUBILIER   2,133,086
ELECTRICAL CONDENSER
Filed July 10, 1935
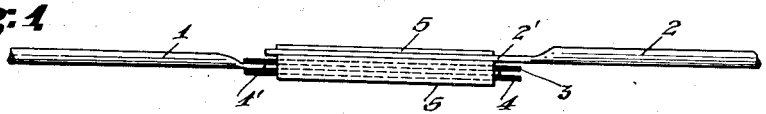
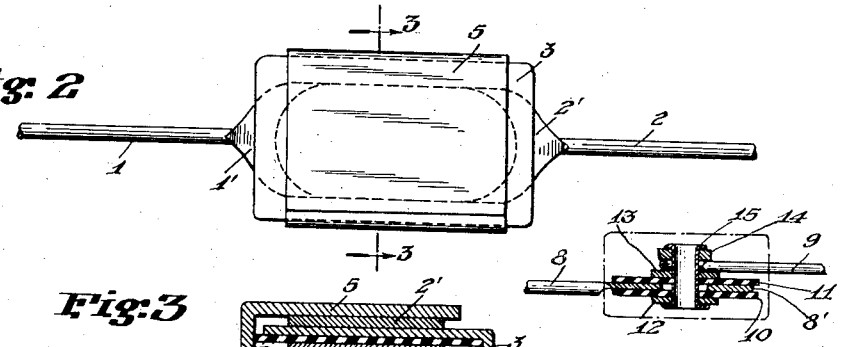
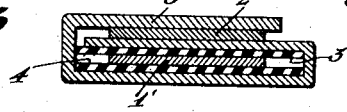
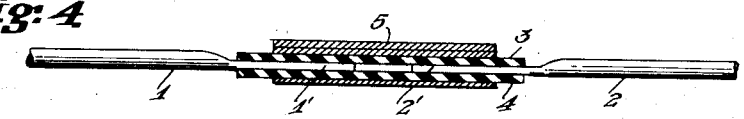
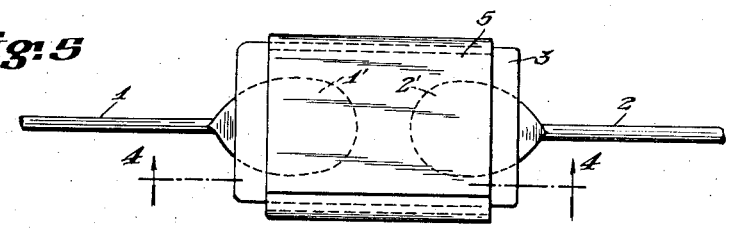
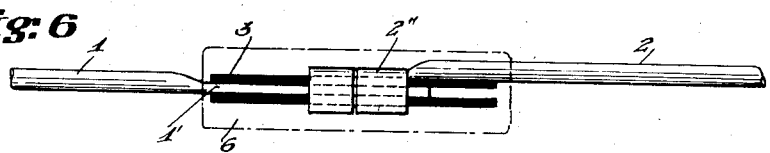
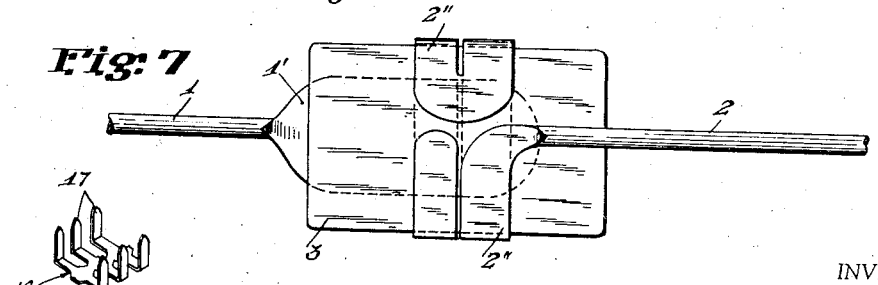
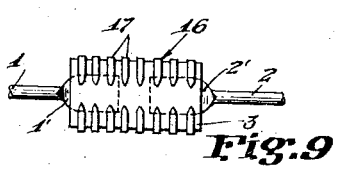
INVENTOR.
William Dubilier
BY
ATTORNEY.

Patented Oct. 11, 1938

2,133,086

UNITED STATES PATENT OFFICE 2,133,086

ELECTRICAL CONDENSER

William Dubilier, New Rochelle, N. Y., assignor to Cornell-Dubilier Corporation, a corporation of New York Application July 10, 1935, Serial No. 30,689

5 Claims. (Cl. 175—41)

The present invention relates to electrical condensers known as fixed condensers of small capacity as used in radio receiving sets and the like.

The invention has for its object to provide an improved construction of electrical condensers, especially those of the type comprising a combined terminal, shield, clamp and/or armature member for the condenser such as described in my copending application Serial No. 729,207 filed June 6, 1934.

A further object of the invention is to provide a small constant capacitor suitable to be produced in large quantities at low cost and capable of being easily assembled with standard parts.

Another object is the provision of a capacitor of extremely small capacity, as low as about 100 mmfd. requiring large quantity production without a large percentage of variation of the capacity values during the manufacture to avoid excessive rejects.

In condensers for short wave work or for circuits requiring stable constants under various changeable conditions, one of the main requirements is to avoid defects now common in small condensers such as bad joints, contact resistances, poor soldering, and unnecessary inductances within the condenser unit. A small additional inductance in the condenser construction is under certain circumstances liable to introduce sufficient impedance to upset the circuit operating conditions and for such condensers this invention is especially adaptable.

According to a further requirement, the capacitor units should be adapted to be easily assembled in order to be molded into a housing or casing such as bakelite or similar material and for that purpose the condensers as illustrated or described herein are especially adaptable in that the capacity will not materially change during or after molding and the electrical dimensions of the unit can be easily determined before molding which will result in the elimination of a large percentage of rejects now experienced with the present type of capacitor construction known in the art.

One method of carrying out the invention consists in the provision of a flexible and easily bendable wire having one end portion flattened out and shaped to present a flat contact or electrode surface and having its unflattened portion projecting outward from the condenser body or stack and serving as a terminal for connecting the condenser in an electrical circuit and if needed a supporting means for mounting the condenser in any desired position by soldering or otherwise connecting it in an electrical apparatus such as a radio set.

A further object of the invention is to provide an improved electrical condenser construction in which the conducting plates are reduced to a minimum for securing extremely small capacity values and wherein the conducting plates or armatures will be effectively held in proper relation to each other in order to keep the capacity of the condenser substantially constant and to avoid contact resistance and other losses.

Other objects and advantages of the invention will appear hereafter from the following description taken with reference to the accompanying drawing wherein I have illustrated several practical embodiments of condenser constructions in accordance with the invention.

Figs. 1 and 2 illustrate on an enlarged scale in elevation and top views, respectively, one form of an electric condenser construction comprising a pair of unitary terminal and electrode members and a clamp and shield member for holding the electrodes in proper relation.

Fig. 3 is a cross-section taken on line 3—3 of Fig. 2.

Figs. 4 and 5 illustrate in cross-section and top views, respectively, a modified construction of a condenser in which the clamp and shield member simultaneously acts as a "floating" armature for the condenser for securing extremely small capacity values.

Figs. 6 and 7 illustrate in cross-section and top views, respectively, another modification for obtaining extremely small capacity values by means of a combined clamp, electrode and terminal member.

Fig. 8 shows a modification of a clamp arrangement as shown by Figs. 6 and 7.

Figs. 9 and 10 illustrate a further modification of a combined clamp and electrode member especially suited for a construction shown by Figs. 5 and 6 and adapted for adjusting or varying the capacity of the assembled condenser.

Similar reference numerals identity similar parts throughout the different views of the drawing.

Referring to Figs. 1 to 3, I have shown a simple condenser construction comprising a pair of armatures interleaved with sheets of dielectric material and a clamp for holding the sheets of the condenser in proper relation to each other. In the embodiment illustrated, numerals 1 and 2 represent a pair of flexible wire members having flattened out end portions 1' and 2' shaped to serve as electrodes of the condenser and interleaved with the sheets of dielectric material such as mica sheets 3 and 4 to form a condenser stack. The thus obtained assembly is fixedly held together by means of a clamp consisting of a sheet of stiff but bendable metal such as tin, brass, aluminum or any other material suitable for holding the unit together until it is properly assembled or molded in a casing or housing and having one end inserted in the condenser stack in the example shown between the flattened portion or armature 2' and the mica sheet 3 and having the remaining portion bent around and pressed into firm engagement with the opposite faces of the condenser stack as seen more clearly from Fig. 3. In this manner the armatures 1' and 2' and the dielectric sheets 3 and 4 are effectively held in their proper relation insuring a substantially constant capacity of the condenser. If the clamp 5 is made of a metal, this may also be used as one of the armatures by spot welding a terminal to clamp 5. This terminal which may be a wire should be connected to clamp 5 both mechanically and electrically or may be one integral part made of one piece so that the extension from clamp 5 becomes a terminal similar to that shown at 2 in Fig. 9, in which case this clamp member becomes one of the armatures. Or for extremely small capacity, a clamping arrangement as shown in Fig. 8 could be utilized where more convenient and economical and where smaller size is necessary.

Referring to Figs. 4 and 5, I have shown a modified construction adapted for condensers of extremely small capacity values. These figures differ from the construction according to Figs. 1 to 3 in that the flattened end or armature portions 1' and 2' of the wires 1 and 2 are arranged separate from each other in non-overlying fashion and held between the mica sheets 3 and 4. Item 5 represents a clamp member similar to the clamp as described in Figs. 1 to 3 firmly bent and pressed around the condenser unit. In this case, besides acting as a shield and clamp to hold the sheets of the condenser in firm relation, the clamp member 5 also acts as an armature for the condenser. In this manner, two condensers are obtained, one of which is formed by the flattened portion or armature 1' and the overlying portion of the clamp 5, and the other is comprised of the flattened portion 2' and the overlying portion of the clamp member 5. Both condensers are connected in series through the clamp itself as is understood, the latter acting as a "floating" armature. During the manufacture, sufficient pressure is applied to the condenser stack such as by subjecting the same to the blow from a suitable press.

Referring to Figs. 6 and 7, these show a modified construction for securing very small capacity values. The condenser shown comprises a fixed armature 1' forming the flattened portion of the wire member 1 in a manner as described before, and placed between a pair of insulating sheets 3 and 4. I have furthermore shown a combined clamp and second armature for the condenser consisting of the flattened portion 2'' of the wire member 2. The portion 2'' is formed somewhat differently from the flattened portions as described in the previous figures by bending the wire 2 at right angle and back and forth in a fashion such as described in more detail in my above mentioned copending application. In this manner, an extended flat surface is obtained which can easily be bent and pressed around the condenser stack to serve as combined clamp, shield and armature for the condenser.

Fig. 8 shows a modified clamp arrangement for the condenser of the type shown by Figs. 6 and 7. The clamp shown in Fig. 8 consists of an eyelet 15 with a metal washer 13 acting as the second condenser armature and with washers 12 and 14 arranged on the opposite faces of the condenser stack. The first armature is formed by a wire member 8 having a flattened armature surface 8' and a connection to the armature 13 secured by a second wire member 9 clamped between the armature 13 and the washer 14. As is understood, the second armature of the condenser may be formed by the end portion of the wire member 9 flattened in a manner similar to the member 8. The flattened portion 8' is pierced to admit eyelet 15 without physically abutting it to eliminate short-circuiting between electrodes 8' and 9 through the eyelet.

Referring to Figs. 9 and 10, I have shown therein a further modification of a condenser construction particularly of the type as illustrated in Figs. 5 and 6 and adapted for adjusting or varying the capacity after assembly of the condenser. This construction differs from the construction described by Figs. 5 and 6 by a modified clamp shown in Fig. 10 in perspective view and comprising a main portion spaced from each other as shown. The lugs 17 are bent and pressed around the condenser stack in a manner similar to the solid clamp 5 as shown more clearly in Fig. 9. This embodiment has the advantage that the capacity of the condenser may be varied or regulated by removing or breaking off one or more of the lugs 17 after the assembly, thus varying the overlying effective area and accordingly the capacity of the condenser.

The condenser after assembly and compression may be mounted in a suitable container, preferably a molded casing as indicated at 6, consisting of a suitable insulating material in a manner as is well known.

One method of making these condensers to have a definite determined capacity is to arrange for dielectric sheets such as mica or other suitable material of a predetermined thickness to give a definite capacity with a definite active armature surface. These units are then assembled before being molded and the capacity determined in a suitable manner so that such units which do not come within a predetermined range of capacity or tolerance will not be wasted by being molded after which it is necessary to reject the units as not coming within a capacity range. Thus a considerable part of the cost is saved by predetermining the capacity of the unit before molding. Another advantage evident from the invention is that the same standard parts can be used for obtaining a large variety of capacitors as for example by utilizing the construction as shown in Fig. 5 where the definite size, say a capacity of 10 mmf. is produced. By changing the position of terminal 1 to make contact with the clamp 5 similar as the design shown in Figs. 1 and 2, the same unit will have a capacity of 20 mmf., all the parts being the same as 10 mmf. except the position of terminal 1 being changed. By making the mica 3 half the thickness, the capacity can be made 40 mmf. or by doubling the thickness the capacity of any of the above values could be halved. So that a very flexible construction is provided for various capacities using the same parts resulting in a big saving in costs and allowing for mass production of similar units.

As will be evident from the above description, the invention is not limited to the specific embodiments presented herein for illustration and the underlying principle is susceptible of various modifications differing from the specific disclosure herein presented and coming within the scope of the invention as defined in the appended claims.

I claim:

1. An electrical condenser comprising a pair of dielectric elements, a pair of wire members having flattened end portions, said end portions being placed between said dielectric elements in spaced relation, a metalic sheet member having a central portion and plurality of spaced projections extending at opposite sides, said main portion engaging the outer face of one of said dielectric elements and said projections being reversely bent to engage the outer face of the other dielectric element.

2. An electrical condenser comprising a pair of dielectric elements, a pair of electrode elements placed between said dielectric elements in spaced relation, a metallic sheet member having a central portion and a plurality of spaced lateral projections extending at opposite sides of said central portion, said central portion engaging the outer face of one of said dielectric elements and said projections being reversely bent to engage the outer face of the other dielectric element in overlapping relation to said electrode elements and terminal means extending from said electrode elements.

3. An electrical condenser comprising a pair of dielectric elements, a pair of electrode elements placed between said dielectric elements in spaced relation, a metallic sheet member reversely bent to engage the outer faces of said dielectric elements in overlapping relation to said electrode elements, said sheet member having spaced projections along at least one of its edges overlapping said electrode elements, terminal means extending from said electrode elements.

4. An electrical condenser comprising a pair of dielectric elements, a pair of wire members having flattened end portions, said end portions being placed between said dielectric elements in spaced relation to each other, a metallic sheet member having tooth-like extensions along at least one of its edges, said sheet member being reversely bent to engage the outer faces of said dielectric sheets with said extensions overlapping said electrode elements.

5. An electrical condenser comprising an electrode, dielectric elements on either side of said electrode, a metallic sheet member having a main portion and plurality of tooth-like extensions along at least one side of said main portion, said sheet member being reversely bent to engage the outer faces of said dielectric elements with said extensions overlapping said electrode.

WILLIAM DUBILIER.